Feb. 24, 1925.

A. J. KERCHER ET AL

ELECTRIC HEATER

Filed April 9, 1923

1,527,363

WITNESS:
H. Sherburne

INVENTORS
Arthur J. Kercher
W. Wesley Hicks.
BY White Prost Evans
their ATTORNEYS.

Patented Feb. 24, 1925.

1,527,363

UNITED STATES PATENT OFFICE.

ARTHUR J. KERCHER, OF BERKELEY, AND WILLIAM WESLEY HICKS, OF SAN FRANCISCO, CALIFORNIA.

ELECTRIC HEATER.

Application filed April 9, 1923. Serial No. 630,687.

*To all whom it may concern:*

Be it known that we, ARTHUR J. KERCHER, a citizen of the United States, and a resident of Berkeley, Alameda County, State of California, and WILLIAM WESLEY HICKS, a citizen of the United States, and a resident of the city and county of San Francisco, State of California, have invented a certain new and useful Electric Heater, of which the following is a specification.

The invention relates to electric heaters and particularly to electric air heaters adapted to raise the temperature of the air in a room or compartment.

An object of the invention is to provide an electric heater in which there is a maximum of visible heated surface in proportion to the power consumed.

Another object of the invention is to provide an electric heater in which the heat is distributed both by radiation and convection.

Another object of the invention is to provide an electric heater in which the major portion of the radiated energy is directed into the room to be heated and in which a minimum of the radiant heat is reflected.

A further object of the invention is to provide an electric heater having a support for the resistance coils whereby they are prevented from sagging when hot.

The invention posssesses other advantageous features, some of which with the foregoing, will be set forth at length in the following description, where we shall outline in full that form of the invention which we have selected for illustration in the drawings accompanying and forming part of the present specification. In said drawings we have shown one specific type of heater embodying our invention, but it is to be understood that we do not limit ourselves to such type, since the invention, as set forth in the claims, may be embodied in a plurality of other forms.

Referring to said drawings.

Figure 1:
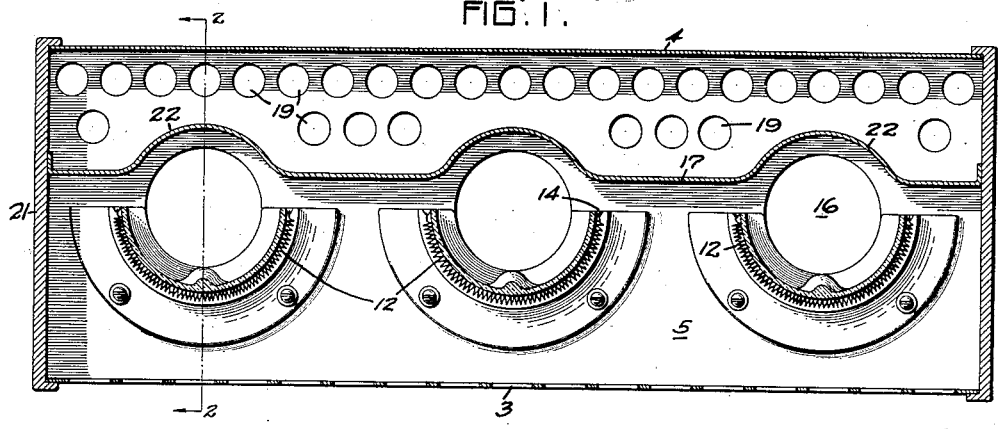
Figure 1 is a horizontal section through a heater embodying our invention.
Figure 2:
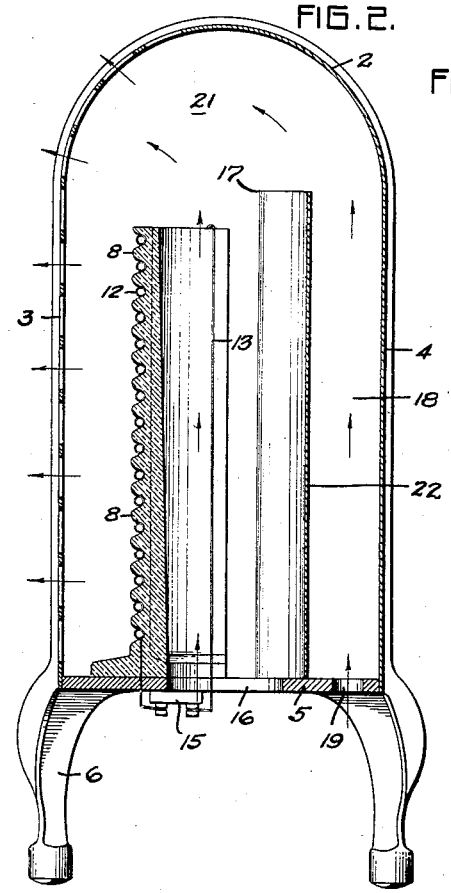
Fig. 2 is a vertical section through the heater taken on the line 2—2, Fig. 1.
Figure 3:
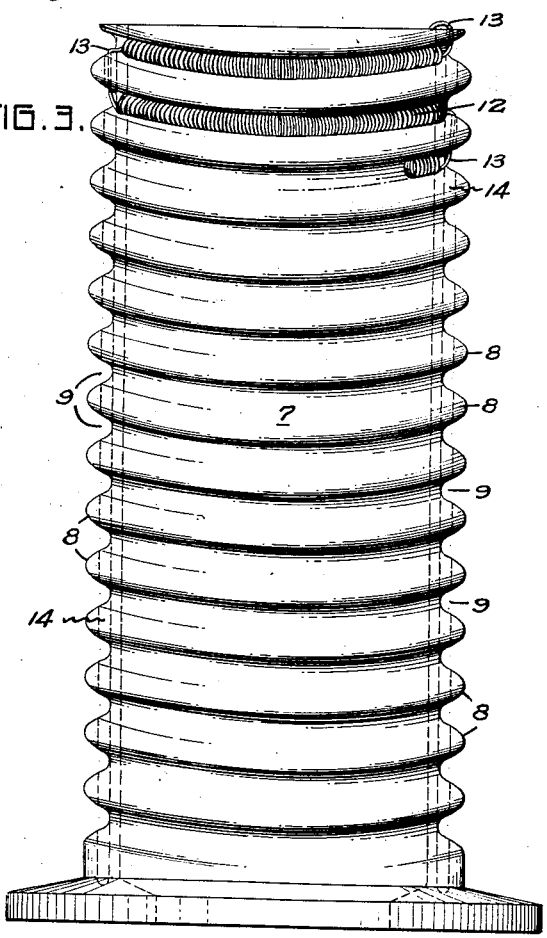
Fig. 3 is an elevation of the heating element supporting core, a portion of the heating element being shown on the core.

The heater of our invention comprises preferably a metallic shell 2, having a perforate front wall 3 and an imperforate rear wall 4. The shell is closed at the bottom by a bottom wall 5 which is provided with apertures, as will be hereinafter set forth. The shell is preferably mounted on legs 6 so that the bottom wall is spaced above the floor or other support upon which the heater is placed, thereby permitting free access of the air to the underside of the bottom 5.

Arranged within the shell and preferably supported on the bottom wall 5, are one or more heating element cores 7, of refractory material. These cores are substantially semi-cylindrical in shape and are arranged within the shell with their convex face toward the front wall 3 of the shell. Each core is provided on its convex face with a plurality of downwardly bowed parallel ribs extending transversely across the core. These ribs 8 provide between them, grooves 9, in which the heating element is disposed. The heating element consists preferably of a resistance wire comprising coiled sections 12, separated by uncoiled sections 13. In arranging the heating element on the core, the coiled sections are disposed in the grooves 9 and the uncoiled sections, which connect the coiled sections, are disposed in notches 14, which are formed on the ends of the ribs. By seating in these notches, the uncoiled sections hold the coiled sections in place in the grooves 9. The grooves are bowed downwardly to conform to the shape which the coiled sections will assume when heated. These sections lose substantially all of their strength when heated and have a tendency to sag, but by arranging them originally in a sagged condition, they do not sag further when heated. The ends of the heating element are secured to a suitable terminal block 15, arranged below the bottom wall 5 and the respective terminal blocks are connected to a switch arranged at a convenient place on the shell, the switch preferably being of such construction that any desired number of the heating elements may be energized. By forming the core semi-cylindrical in shape and arranging the heating element on the convex side of the core, the whole of the heating element is visible from the front of the shell and substantially all of the heat radiated by the heating element is directed toward the front of the shell. This feature is advantageous in that, but a small amount of the radiant heat is directed back toward the reflector and the major portion of it is radiated directly toward the front wall of the shell.

The bottom wall 5 is provided with apertures 16, opening into the space formed by the rear concave face of the core so that air is permitted to pass upward in contact with the rear face of the core. The core becomes heated, due to contact with the heating element and this heat, raises the temperature of the air in contact with the rear face of the core, causing an upward flow of this air. This establishes convection currents so that the heater operates to distribute its heat both by radiation and convection. A reflecting plate 17 is preferably interposed between the rear sides of the cores and the back wall 4, to reflect forward any radiant energy which is directed backward, thereby keeping the back wall 4 of the heater cool and providing a flue 18, between the reflector and the back wall, through which air passes upwardly. The bottom wall 5 is provided with a plurality of apertures 19, to permit the circulation of air through the flue 18. The reflector 17, preferably extends across the heater, connecting the end walls 21 and is preferably provided, in the rear of each core, with a backwardly curved or bent portion 22, which, with the core, forms a substantially cylindrical flue through which the passage of air is induced by the heat of the core.

This construction provides a very efficient heater, from which the heat is very rapidly dissipated, either by convection or radiation, so that the temperature of the shell is not raised to any great magnitude. The shell may, therefore, be nickel plated or otherwise treated to make it of attractive appearance and, during operation, the shell does not reach a sufficient temperature to injure the plating or other decorative feature.

We claim:

1. In an electric heater, a heating element comprising a support of refractory material, a plurality of parallel ribs extending across the support, said ribs being bowed downwardly and a resistance wire provided with coiled sections separated by uncoiled sections arranged on the support, the coiled sections being disposed between the ribs and the uncoiled sections extending around the ends of the ribs.

2. In an electric heater, a heating element comprising a semi-cylindrical core of refractory material adapted to be disposed with its longitudinal axis vertical, a plurality of substantially horizontal parallel ribs extending across the convex face of the core forming a plurality of grooves and spirally wound coils of resistance wire disposed in the grooves and supported by the ribs, to prevent the coils from sagging while hot.

3. In an electric heater, a heating element comprising a semi-cylindrical core of refractory material, a plurality of downwardly bowed ribs extending across the convex face of the core and coils of resistance wire disposed between the ribs.

4. In an electric heater, a heating element comprising a semi-cylindrical core of refractory material, a plurality of downwardly bowed ribs extending across the convex face of the core and a resistance wire provided with coiled sections separated by uncoiled sections, arranged on the support, the coiled sections being disposed between the ribs and the uncoiled sections extending around the ends of the ribs.

5. In an electric heater, a heating element comprising a semi-cylindrical core of refractory material, a plurality of downwardly bowed ribs extending across the convex face of the core and a resistance wire provided with coiled sections separated by uncoiled sections, arranged on the support, the coiled sections being disposed between the ribs and the uncoiled sections extending around the ends of the ribs, the ribs being undercut on their ends to form grooves to receive the uncoiled sections.

6. In an electric heater, a heating element comprising a semi-cylindrical core of refractory material, a plurality of parallel ribs extending across the convex side of the core and a resistance wire provided with coiled sections separated by uncoiled sections, arranged on the support, the coiled sections being disposed between the ribs and the uncoiled sections extending around the ends of the ribs.

7. In an electric heater, a heating element comprising a semi-cylindrical core of refractory material, a plurality of substantially horizontal ribs extending across the convex side of the core and resistance wire provided with coiled sections separated by uncoiled sections, arranged on the support, the coiled sections being disposed between the ribs and the uncoiled sections extending around the ends of the ribs, the ribs being undercut on their ends to form grooves to receive the uncoiled sections.

8. In an electric heater, a vertically disposed semi-cylindrical core of refractory material, a heating element disposed on the convex front face of the core, a bottom plate on which the core is mounted and a back plate arranged behind and spaced from the core and forming a flue with the concave back face of the core, the bottom plate being provided with an aperture opening into the flue to permit the flow of air through the flue.

9. In an electric heater, a shell having an apertured front, a bottom plate in the shell, a plurality of vertically disposed, semi-cylindrical cores arranged on the bottom wall with the convex faces of the cores facing the front of the shell, a heating element on the front of each core and a back plate arranged between the cores and the back wall of the shell, and spaced from the cores and the back wall.

10. In an electric heater, a shell having an apertured front, a bottom plate in the shell, a plurality of vertically disposed laterally spaced semi-cylindrical cores arranged in the shell with the convex faces of the cores facing the front of the shell, a heating element on the front of each core and a back plate disposed behind the cores, the back plate being curved backwardly behind each core to form flues with the concave rear faces of the cores, the bottom plate being provided with apertures opening into the flues to permit the flow of air through the flues.

11. In an electric heater, a shell having an apertured front wall, end walls, and bottom wall, a plurality of semi-cylindrical cores arranged on said bottom wall with the convex faces of the cores facing the front, a heating element on the front of each core, and an intermediate wall extending from end wall to end wall and disposed between the cores and the back wall of the shell, said bottom wall being provided with apertures to permit the flow of air in front of and in back of the intermediate wall.

In testimony whereof, we have hereunto set our hands.

ARTHUR J. KERCHER.
WILLIAM WESLEY HICKS.